L. KEHLET.
HASP FASTENER.
APPLICATION FILED AUG. 24, 1910.
992,565.
Patented May 16, 1911.
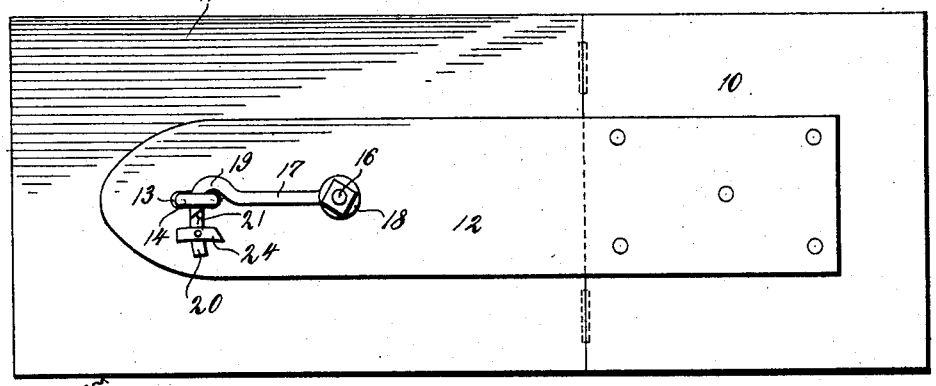
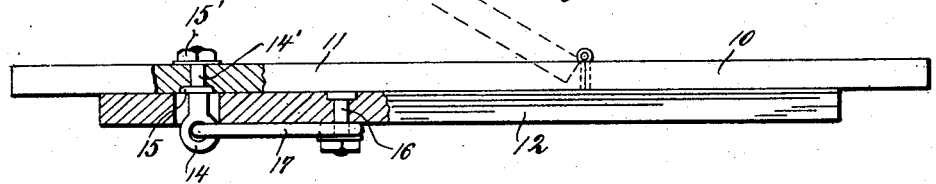
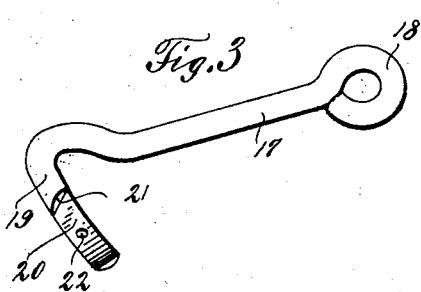
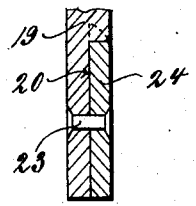
Witnesses
E. Larson
Charles Albilon
Inventor
L. Kehlet
By Robert Cobb
Attorneys

UNITED STATES PATENT OFFICE.

LAURITS KEHLET, OF NEWELL, IOWA.

HASP-FASTENER.

992,565.  Specification of Letters Patent.  Patented May 16, 1911.

Application filed August 24, 1910. Serial No. 578,794.

*To all whom it may concern:*

Be it known that I, LAURITS KEHLET, a citizen of Germany, residing at Newell, in the county of Buena Vista and State of Iowa, have invented certain new and useful Improvements in Hasp-Fasteners, of which the following is a specification.

This invention relates to end gates for vehicles, and particularly to the fastening means for the same which will automatically be locked in place.

The object of the present invention is to construct a hook which will have a gravity catch at the terminal thereof formed from the shank of the hook.

With the above and other objects in view, this invention consists in the construction, combination, and arrangement of parts, all as hereinafter more fully described, claimed, and illustrated in the accompanying drawings, wherein—

Figure 1 is an elevation illustrating the coöperation of the hook forming the subject matter of the present invention with an end gate; Fig. 2 is a top plan view thereof illustrating parts thereof in section; Fig. 3 is a perspective view of the hook illustrating the gravity catch removed; Fig. 4 is a section taken through the end of the hook illustrating the mounting of the gravity hook.

Reference being had more particularly to the drawings, 10 indicates a stationary portion of the end gate of a vehicle to which the end gate 11 is pivoted. A bar 12 is carried by the portion 10 and projects over the end gate 11. This bar 12 is provided with an opening 13 through which an eye 14 carried by the end gate projects, the shank 14' of said eye being provided with a collar 15 adjacent to the inner surface of the end gate while the terminal thereof has a nut 15' threaded thereon, said nut and collar causing the shank 14' to securely and rigidly engage the end gate 11. A bolt 16 is carried by the bar 12 adjacent to the opening 13, the head of said bolt being counter-sunk in said bar. A shank 17 is pivotally mounted on the bolt 16 through the instrumentality of the eye 18 and is of such a length that the hook portion 19 thereof coöperates with the eye 14 carried by the end gate. The terminal of the hook portion 19 has one side thereof cut away forming a depression 20, the upper end 21 of said depression being beveled upwardly. An opening 22 is centrally provided in the cut away portion of the hook 19 in which a rivet or pin 23 is retained. The material cut from the hook portion 19 to form the depression 20 is pivoted on the pin 23 forming a locking member 24, the upper terminal of which is beveled to coincide with the beveled portion 21 of the depression 20. From this construction it will readily be understood that when the hook 19 is placed in the eye 14, the locking member 24 will drop, thus preventing the hook from jarring downwardly. It will be observed that should the locking member drop only slightly and there be only a small portion thereof projecting from the top portion of the hook 19, this small portion will engage the eye 14 should the hook make a movement to elevate the same, thus causing the locking member to swing to the positions shown in Fig. 1. I am aware that heretofore hooks of this nature have been in use wherein the hook portion is provided with a pair of downwardly extending ears between which a locking member is pivoted. However, it is the object of the present invention to overcome the objectionable features of this construction, and the expense in manufacturing, by constructing a locking member directly from the body portion of the hook.

Having thus fully described my invention, what is claimed as new is:—

An article of manufacture, comprising a hook having one side thereof cut away forming a depression, the upper terminal of which is obliquely arranged, a catch formed by said cut away portion and pivoted in the depression formed by said portion, said catch having the upper terminal thereof obliquely arranged to form a stop for the catch in combination with the oblique portion of the hook, said catch resting flush with the hook throughout its entire length when said catch is in its inoperative position.

In testimony whereof I affix my signature in presence of two witnesses.

LAURITS KEHLET.

Witnesses:
CHR. FREDERIKSEN,
C. CAPION.

---

Copies of this patent may be obtained for five cents each, by addressing the "Commissioner of Patents, Washington, D. C."